United States Patent [19]

Takeuchi et al.

[11] 4,140,695
[45] Feb. 20, 1979

[54] PROCESS FOR PRODUCING COPPER PHTHALOCYANINES

[75] Inventors: Seiji Takeuchi, Shizuoka; Sadayoshi Matsui, Shimizu, both of Japan

[73] Assignee: Ihara Chemical Industry Co., Ltd., Shizuoka, Japan

[21] Appl. No.: 860,893

[22] Filed: Dec. 15, 1977

Related U.S. Application Data

[63] Continuation of Ser. No. 736,336, Oct. 28, 1976, abandoned.

[30] Foreign Application Priority Data

Dec. 27, 1975 [JP] Japan ............................ 50-158488

[51] Int. Cl.$^2$ ............................................. C09B 47/04
[52] U.S. Cl. .................................................. 260/314.5
[58] Field of Search ...................................... 260/314.5

[56] References Cited

U.S. PATENT DOCUMENTS 2,657,213  10/1953  Dudnikov ................... 260/314.5

OTHER PUBLICATIONS

Moser et al., Phthalocyanine Compounds, pp. 148–151, Reinhold Pub. Corp., N.Y. (1963).

*Primary Examiner*—John D. Randolph
*Attorney, Agent, or Firm*—Oblon, Fisher, Spivak, McClelland & Maier

[57] ABSTRACT

Copper phthalocyanines are produced by reacting a phthalic anhydride or phthalimide with a copper compound and urea in the presence of a catalyst in a polyalkyl-monochlorobenzene having at least two lower alkyl groups and having the formula

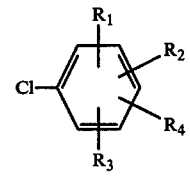

wherein $R_1$ and $R_2$ respectively represent a lower alkyl group having 1 to 3 carbon atoms; $R_3$ and $R_4$ respectively represent hydrogen atom or a lower alkyl group having 1 to 3 carbon atoms.

6 Claims, No Drawings

PROCESS FOR PRODUCING COPPER PHTHALOCYANINES

This is a continuation of application Ser. No. 736,336, filed Oct. 28, 1976, now abandoned.

BACKGROUND OF THE INVENTION

The present invention relates to a process for producing copper phthalocyanines which are important as organic pigments.

More particularly, it relates to a process for producing copper phthalocyanines having high quality and high tinting strength, without producing a toxic by-product by an advantageous industrial operation, which comprises reacting a phthalic anhydride or a phthalimide with a copper compound and urea in the presence of a catalyst in a specific polyalkyl monochlorobenzene.

It has been known that in the conventional industrial process for producing the copper phthalocyanines by reacting a phthalic anhydride or a phthalimide with a copper compound and urea in the presence of a catalyst, the yield of the copper phthalocyanine is highly affected depending upon the selected reaction solvent, and also the tinting strength and the hue are highly affected depending upon the selected reaction solvent. It has been also known that in the physical properties of the optimum reaction solvent, the boiling point at the atmospheric pressure should be in a range of 160° to 250° C. and the difference between the initial boiling point and the dry point should be less than 10° C. and the thermal stability should be high.

Usually, trichlorobenzene, nitrobenzene and alkylbenzenes have been used as the reaction solvent having the optimum physical properties.

However, trichlorobenzene has high toxicity and reacts via the Ullmann reaction to form polybiphenylchloride (PCB) which is toxic and is a common and severely disturbing pollution source by polycondensation of trichlorobenzene, because the copper compound is included in the reaction system.

Nitrobenzene is also toxic so that the allowable concentration in air is regulated to be less than 1 ppm from the viewpoint of the labor hygiene. When nitrobenzene comes into contact with the skin, it is rapidly absorbed into the skin. When nitrobenzene is used in industrial operations, it is necessary to equip an expensive apparatus for collecting it to prevent the discharge in order to maintain the allowable concentration. Accordingly, nitrobenzene is not suitable as the reaction solvent in industrial operations.

Alkylbenzenes have the wide range of the boiling point and accordingly, when alkylbenzenes are recovered by distillation under a reduced pressure after the reaction, an amount of a residue having high boiling point is large to cause low recovery ratio and the operation is complicated disadvantageously. When the residue is included in the copper phthalocyanines, the tinting strength in the pigmentation is inferior and the hue is inferior.

SUMMARY OF THE INVENTION

It is an object of the present invention to provide a process for producing copper phthalocyanines having high quality in high yield without formation of a toxic by-product.

Another object of the invention is to provide a process for producing copper phthalocyanines without pollution by a simple operation in high efficiency.

These objects of the invention have been attained by producing copper phthalocyanines by reacting a phthalic anhydride or a phthalimide with a copper compound and urea in the presence of a catalyst in a polyalkyl monochlorobenzene having at least two loweralkyl groups and having the formula

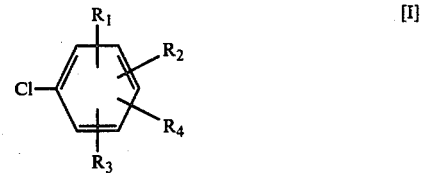

wherein $R_1$ and $R_2$ respectively represent a lower alkyl group having 1 to 3 carbon atoms; $R_3$ and $R_4$ respectively represent hydrogen atom or a lower alkyl group having 1 to 3 carbon atoms. The phthalic anhydrides and phthalimides can have desired substituent corresponding to desired types of the copper phthalocyanines.

DETAILED DESCRIPTION OF THE EMBODIMENT

The inventors have studied to overcome the disadvantages of the reaction solvents used in the conventional processes and to find a reaction solvent for producing copper phthalocyanines having high quality in high yield without the formation of a toxic by-product in the advantageous industrial operation, in the production of the copper phthalocyanines by reacting a phthalic anhydride or a phthalimide with a copper compound and urea in the presence of a catalyst.

As a result, it has been found that the polyalkyl monochlorobenzenes have optimum boiling points suitable for the production of the copper phthalocyanines and the difference between the initial boiling point and the dry point is remarkably small and no significant distillation residue remains and the thermal stability is excellent and toxic by-products such as PCB are not formed and the solubilities for the starting materials in the production of the copper phthalocyanines are high enough.

It has been found that copper phthalocyanines having high quality can be obtained in high yield and high efficiency under the safety operation from the viewpoint of environmental hygiene. The polyalkyl monochlorobenzenes can be produced by reacting a monochlorobenzene having at least one alkyl group having 1 to 3 carbon atoms with an alkyl halide having 1 to 3 carbon atoms or an unsaturated hydrocarbon such as ethylene and propylene in the presence of a Lewis acid such as anhydrous aluminum chloride and anhydrous ferric chloride. It is also possible to produce the polyalkyl monochlorobenzenes by a monochlorination of the benzene ring of an alkylbenzene having at least two alkyl groups having 1 to 3 carbon atoms on the benzene ring.

The process of the invention is carried out by reacting on phthalic anhydride or a phthalimide with a copper compound and urea in the presence of a catalyst in the polyalkyl monochlorobenzene having the formula [I] at 130° to 280° C. preferably 160° to 250° C. for 2 to 8 hours under the atmospheric pressure or higher pressure.

The polyalkylmonochlorobenzenes having the formula [I] which are used as the reaction solvent in the invention, can be produced in advantageous industrial operations, as follows.

A monochlorobenzene compound such as chlorotoluene, chloroxylene, trimethylchlorobenzene, ethylchlorobenzene, diethylchlorobenzene, propylchlorobenzene, dipropylchlorobenzene or the like is reacted with an alkyl halide such as methyl chloride, ethyl chloride, propyl chloride or the like at −20° C. to 70° C. under atmospheric pressure or higher pressure in the presence of anhydrous aluminum chloride or anhydrous ferric chloride in an amount of more than 0.1 mole% to the monochlorobenzene compound whereby methyl, ethyl or propyl group can be easily substituted on the benzene ring of the monochlorobenzene compound. The positions and the number of the substituents on the benzene ring can be selected by the reaction conditions.

After the reaction, the polyalkyl monochlorobenzene can be separated by a distillation under a reduced pressure.

The resulting polyalkyl monochlorobenzenes have excellent thermal stability and are stable under the condition of the temperature for producing the copper phthalocyanines such as 130° to 280° C.

However, polyalkyl monochlorobenzenes having one or more alkyl group having more than 4 carbon atoms, such as polyalkyl monochlorobenzene having isobutyl group have inferior thermal stability and deteriorate even in the above mentioned temperature range.

Accordingly, the alkyl groups substituted on the benzene ring of the polyalkyl monochlorobenzenes as the reaction solvent in the process of the invention should be alkyl group having 1 to 3 carbon atoms.

The resulting polyalkyl monochlorobenzenes [I] as the reaction solvent, have exellent property for dissolving the phthalic anhydrides, phthalimides, the copper compounds, urea and the catalysts used in the reaction, whereby these components are easily blended to smoothly perform the reaction.

Suitable polyalkyl monochlorobenzenes used in the process of the invention are as follows. Incidentally, the compound numbers will be referred in the following preparations and examples.

(1) methyl-o-ethyl chlorobenzene

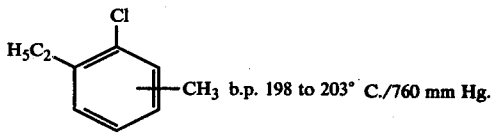 $CH_3$ b.p. 198 to 203° C./760 mm Hg.

(2) ethyl-m-ethylchlorobenzene

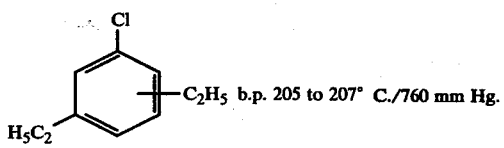 $C_2H_5$ b.p. 205 to 207° C./760 mm Hg.

(3) monoisopropyl-o-chlorotoluene

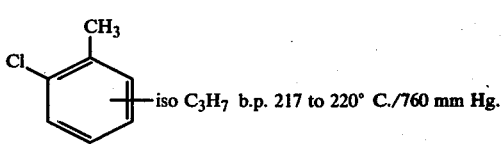 iso $C_3H_7$ b.p. 217 to 220° C./760 mm Hg.

(4) monoisopropyl-m-chlorotoluene

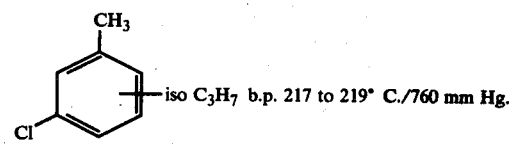 iso $C_3H_7$ b.p. 217 to 219° C./760 mm Hg.

(5) monoisopropyl-p-chlorotoluene

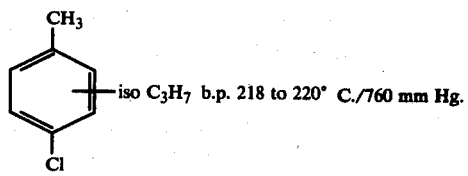 iso $C_3H_7$ b.p. 218 to 220° C./760 mm Hg.

(6) isopropyl-p-isopropyl chlorobenzene

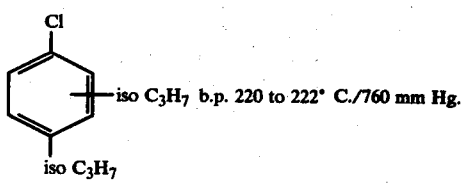 iso $C_3H_7$ b.p. 220 to 222° C./760 mm Hg.

(7) trimethyl-monochlorobenzene

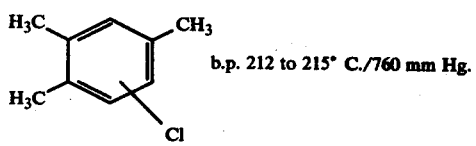 b.p. 212 to 215° C./760 mm Hg.

(8) 2,4,6-trimethyl monochlorobenzene

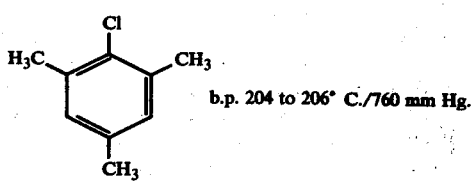 b.p. 204 to 206° C./760 mm Hg.

(9) 2,3,5,6-tetramethyl monochlorobenzene

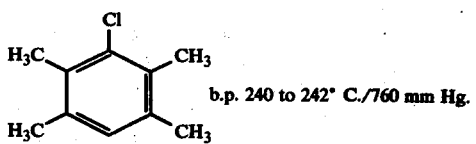 b.p. 240 to 242° C./760 mm Hg.

(10) 2,3,4,6-tetramethyl monochlorobenzene

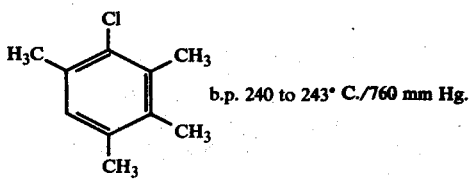 b.p. 240 to 243° C./760 mm Hg.

Suitable copper compounds used in the process of the invention include copper powder, copper chlorides e.g.

cuprous chloride, cupric chloride, copper salts of organic acids such as copper acetates.

Suitable catalysts used in the process of the invention include molybdenum oxide, ammonium molybdenate, boron oxides, tungsten oxide and the like.

Thus, in accordance with the process of the invention, the copper phthalocyanines having quality can be obtained in high yields higher than 90% and high efficiency in the industrial operation.

The characteristics and advantages of the process of the invention will be illustrated.

The polyalkyl monochlorobenzenes [I] used as the reaction solvent in the process of the invention have the optimum boiling point for the condition of the temperature in the production of the copper phthalocyanines and the components for the reaction are easily dissolved in the reaction solvent whereby the copper phthalocyanines can be produced in high yield.

In accordance with the process of the invention, the quality of the copper phthalocyanines as the pigment is remarkably superior to the quality of the copper phthalocyanines which is produced by using trichlorobenzene or nitrobenzene as the reaction solvent which has been considered to have high quality.

Usually, the crude copper phthalocyanines produced by these reactions consists of flake-like coarse particles containing relatively large amount of by-products, whereby the hue is not bright and the tinting strength is low to be difficult to use them as the pigment. Accordingly, the crude reaction products are converted to α-type copper phthalocyanines by dissolving or dispersing the crude reaction products in conc. sulfuric acid and then pouring the solution or the slurry into large amount of water to form fine precipitates (the acid pasteing method or the acid slurry method), or they are converted to β-type copper phthalocyanines by blending the crude reaction product to an inorganic salt and mechanically grinding them (the salt grinding method).

The crude copper phthalocyanines produced by using trichlorobenzene as the reaction solvent, are flaky coarse particles (diameter of 20 to 50 microns) as stated above, whereby the time for dissolving them in conc. sulfuric acid for the pigmentation by the acid pasteing method, is usually 5 to 10 hours.

On the contrary, the crystals of the crude copper phthalocyanines produced by using the specific solvent in the invention have fine needle-like shape having a diameter of 0.5 to 1.0 micron and are soft, whereby the time for dissolving or dispersing them is remarkably shortened.

In the salt grinding method, the crude copper phthalocyanines produced by the process of the invention can be ground for short time.

The resulting pigments of α-type or β-type copper phthalocyanines have bright hue and have the tinting strength of about 15 to 25% higher than those of the pigments produced by the conventional processes.

The polyalkyl monochlorobenzenes [I] used as the reaction solvent in the process of the invention have the above mentioned characteristics and have narrow boiling point range. Accordingly, the recovery of the solvent can be easily attained by the distillation under a reduced pressure after the reaction, and the distillation is accomplished for short time. The thermal stability of the reaction solvent is high and an amount of the residue by the distillation is negligible, whereby the pigments are not contaminated with the residues and the hue and the quality of the pigments are not affected by the residues.

The polyalkyl monochlorobenzenes [I] used as the reaction solvent in the process of the invention, have low toxicity comparing with the conventional reaction solvents such as nitrobenzene, and the toxic by-product such as PCB which is remarkable environment pollution source, is not formed though it is formed by the conventional process using trichlorobenzene.

Accordingly, in accordance with the process of the invention, the copper phthalocyanines can be produced without the polluction.

The invention will be further illustrated by certain examples. The preparation of the polyalkyl monochlorobenzenes [I] used as the reaction solvent in the invention will be illustrated.

Preparation 1

A 1.12 g of anhydrous aluminum chloride was added to 152 g of o-chlorotoluene, and 94 g of isopropylchloride was added dropwise to the mixture with stirring at lower than 10° C. After the addition, the reaction was continued at 10° C. for 5 hours.

After the reaction, the reaction mixture was washed with water and then, was neutralized with a dilute aqueous solution of sodium hydroxide, and was washed with water and distilled under a reduced pressure to separate the unreacted o-chlorotoluene whereby 162 g of monoisopropyl-o-chlorotoluene (3) having a boiling point of 110 to 112° C./20 mm Hg was obtained (yield of 80.0%).

According to the gas chromatography analysis of the resulting monoisopropyl o-chlorotoluene, it was confirmed that the product was a mixture of 4-isopropyl-2-chlorotoluene and 5-isopropyl-2-chlorotoluene.

Preparation 2

A 1.12 g of anhydrous aluminum chloride was added to 152 g of p-chlorotoluene and 94 g of isopropyl chloride was added to the mixture with stirring at lower than 10° C. After the addition, the reaction was continued at 10° C. for 5 hours.

After the reaction, the reaction mixture was treated in accordance with the process of Preparation 1 to obtain 158 g of monoisopropyl-p-chlorotoluene (5) having a boiling point of 77 to 78° C./9 mm Hg. (yield of 78%).

According to the gas chromatography analysis of the resulting monoisopropyl-p-chlorotoluene, it is confirmed that the product is a mixture of 2-isopropyl-4-chlorotoluene and 3-isopropyl-4-chlorotoluene.

EXAMPLE 1

A 200 g of phthalic anhydride, 244 g of urea, 34 g of cuprous chloride and 0.4 g of ammonium molybdate were added to 350 g of monoisopropyl-o-chlorotoluene (3) and the reaction was carried out at 200° C. for 3 hours under the atmospheric pressure.

After the reaction, the solvent of monoisopropyl-o-chlorotoluene (3) was distilled off from the reaction mixture by distillation under a reduced pressure. The residue was washed with a hot water and filtered and then was washed with an acid and filtered, and was washed with water and dried to obtain 183 g of a crude copper phthalocyanine having a purity of higher than 98% (yield of 92%).

The α-type pigment was prepared by the pigmentation by the acid pasteing method (PB report No. 85172, British Pat. No. 502,623) and the β-type pigment was prepared by the pigmentation by the salt grinding method U.S. Pat. Nos. 2,486,304 and 2,486,351).

The α-type pigment and the β-type pigment were prepared by the same pigmentation of the crude copper phthalocyanine produced by using trichlorobenzene as the reaction solvent. In accordance with the test method of Japanese Industrial Standard No. K5101-1964, the pigments of the invention had the tinting strength of 20 to 25% higher than those of the pigments produced by using trichlorobenzene, and had superior brightness.

The process was repeated except substituting monoisopropyl-o-chlorotoluene (3) with monoisopropyl-m-chlorotoluene (4) or monoisopropyl-p-chlorotoluene, to obtain copper phthalocyanine pigment having high quality in a yield of higher than 90%.

EXAMPLE 2

A 200 g of phthalimide, 204 g of urea, 34 g of cuprous chloride and 0.4 g of ammonium molybdate were added to 350 g of monoisopropyl-o-chlorotoluene (3) and the reaction was carried out at 200° C. for 3 hours under the atmospheric pressure.

After the reaction, the solvent of monoisopropyl-o-chlorotoluene (3) was distilled off from the reaction mixture by the distillation under a reduced pressure. The residue was washed with a hot water and filtered and then, was washed with an acid and filtered, and was washed with water and dried to obtain 189 g of a crude copper phthalocyanine having a purity of higher than 98% (yield of 94%).

The α-type pigment was prepared by the pigmentation by the acid pasteing method and the β-type pigment was prepared by the pigmentation by the salt grinding method.

The α-type and β-type pigments of the invention had the tinting strength of 20 to 25% higher than those of the α-type and β-type pigments prepared by the same pigmentation of the crude copper phthalocyanine produced by using trichlorobenzene as the reaction solvent, and had superior brightness.

EXAMPLE 3

A 200 g of phthalimide, 204 g of urea, 34 g of cuprous chloride and 0.4 g of ammonium molybdate were added to 350 g of 2,4,6-trimethyl monochlorobenzene (7) and the reaction was carried out at 200° C. for 3 hours under the atmospheric pressure.

After the reaction, the solvent of 2,,4,6-trimethyl monochlorobenzene (7) was distilled off from the reaction mixture by the distillation under a reduced pressure. The residue was washed with a hot water and filtered and then, was washed with an acid and filtered, and was washed with water and dried to obtain 178 g of a crude copper phthalocyanine having a purity of higher than 97% (yield of 90%).

The α-type pigment was prepared by the pigmentation by the acid pasteing method and the β-type pigment was prepared by the pigmentation by the salt grinding method.

The α-type and β-type pigments of the invention had the tinting strength of 15 to 20% higher than those of the α-type and β-type pigments prepared by the same pigmentation of the crude copper phthalocyanine produced by using trichlorobenzene as the reaction solvent, and had superior brightness.

EXAMPLE 4

A 200 g of phthalimide, 204 g of urea, 34 g of cuprous chloride and 0.4 g of ammonium molybdate were added to 350 g of 2,3,4,6-tetramethyl monochlorobenzene (10) and the reaction was carried out at 230° C. for 3 hours under the atmospheric pressure.

After the reaction, the solvent of 2,3,4,6-tetramethyl monochlorobenzene (10) was distilled off from the reaction mixture by the distillation under a reduced pressure. The residue was washed with a hot water and filtered and then, was washed with an acid and filtered, and was washed with water and dried to obtain 177 g of a crude phthalocyanine having the purity of higher than 95% (yield of 90%).

The α-type pigment was prepared by the pigmentation by the acid pasteing method and the β-type pigment was prepared by the pigmentation by the salt grinding method.

The α-type and β-type pigments of the invention had the tinting strength of 15 to 20% higher than those of the α-type and β-type pigments prepared by the same pigmentation of the crude copper phthalocyanine produced by using trichlorobenzene as the reaction solvent, and had superior brightness.

EXAMPLE 5

A 200 g of phthalimide, 204 g of urea, 34 g of cuprous chloride and 0.4 g of ammonium molybdate were added to 350 g of monoisopropyl-o-chlorotoluene (3) and the reaction was carried out at 160° C. for 3 hours under the pressure of 2.5 Kg/cm$^2$ (gauge).

After the reaction, the solvent of monoisopropyl-o-chlorotoluene (3) was distilled off from the reaction mixture by the distillation under a reduced pressure. The residue was washed with a hot water and filtered and then, was washed with an acid and filtered, and washed with water and dried to obtain 194 g of a crude phthalocyanine having the purity of higher than 98% (yield of 97%).

The α-type pigment was prepared by the pigmentation by the acid pasteing method and the β-type pigment was prepared by the pigmentation by the salt grinding method.

The α-type and β-type pigments of the invention had the tinting strength of 20 to 25% higher than those of the α-type and β-type pigments prepared by the same pigmentation of the crude copper phthalocyanine, produced by using trichlorobenzene as the reaction solvent, and had superior brightness.

What is claimed is:

1. In a process for producing copper phthalocyanine compounds by reacting a phthalic anhydride or a phthalimide with a copper compound and urea in a solvent at a temperature of 130° C. to 280° C. at atmospheric pressure to higher pressures in the presence of a catalyst which promotes the copper phthalocyanine reaction, the improvement comprising: conducting said reaction in a solvent of a polyalkylmonochlorobenzene having at least two lower alkyl groups and having the formula

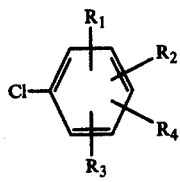

wherein $R_1$ and $R_2$ represent lower alkyl groups of 1 to 3 carbon atoms; and $R_3$ and $R_4$ each represent a hydrogen atom or a lower alkyl group of 1 to 3 carbon atoms.

2. A process according to claim 1 wherein said reaction solvent is produced by reacting chlorotoluene, chloroxylene, trimethyl chlorobenzene, ethyl chlorobenzene, diethyl chlorobenzene or propyl chlorobenzene with methyl chloride, ethyl chloride or propyl chloride or ethylene or propylene in the presence of Lewis acid.

3. A process according to claim 1 wherein said reaction solvent is produced by a monochlorination of the benzene ring of an alkyl benzene having at least two alkyl groups having 1 to 3 carbon atoms.

4. A process according to claim 1 wherein said reaction solvent is methyl-o-ethyl chlorobenzene, ethyl-m-ethyl chlorobenzene, monoisopropyl-o-chlorotoluene, monoisopropyl-m-chlorotoluene, monoisopropyl-p-chlorotoluene, isopropyl-p-isopropyl chlorobenzene, trimethyl monochlorobenzene, 2,4,6-trimethyl monochlorobenzene, 2,3,5,6-tetramethyl monochlorobenzene, 2,3,4,6-tetramethyl monochlorobenzene.

5. A process according to claim 1 wherein said copper compound is copper powder, copper chloride or a copper salt of organic acid, and said catalyst is molybdenum oxide, ammonium molybdate, boron oxide or tungsten oxide.

6. A process according to claim 1, wherein said phthalic anhydrides and phthalimides have a substituent corresponding to desired copper phthalocyanines.

* * * * *